United States Patent [19]
Hermansen et al.

[11] Patent Number: 6,059,245
[45] Date of Patent: May 9, 2000

[54] LOCKING WATER BOTTLE CAGE FOR BICYCLES

[76] Inventors: Frank Hermansen; Carl Winefordner, both of 548 Seaward Rd., Corona Del Mar, Calif. 92625

[21] Appl. No.: 09/100,361

[22] Filed: Jun. 19, 1998

Related U.S. Application Data

[63] Continuation-in-part of application No. 09/079,078, May 14, 1998.

[51] Int. Cl.$^7$ ...................................................... A47K 1/08
[52] U.S. Cl. ..................... 248/311.2; 248/313; 248/316.5
[58] Field of Search ................................ 248/311.2, 313, 248/316.1, 316.2, 316.5, 316.8; 224/414, 425

[56] References Cited

U.S. PATENT DOCUMENTS

| | | | |
|---|---|---|---|
| 1,007,062 | 10/1911 | Carlson et al. | 248/313 |
| 1,288,839 | 12/1918 | Conrad et al. | 248/313 |
| 2,277,738 | 3/1942 | Wilkinson | 248/311.2 X |
| 4,570,835 | 2/1986 | Criqui et al. | 224/414 |
| 4,997,157 | 3/1991 | Sweeny | 248/313 |
| 5,040,709 | 8/1991 | Neugent | 224/35 |
| 5,098,054 | 3/1992 | Dyer | 248/313 |
| 5,170,981 | 12/1992 | Lin | 248/311.2 |
| 5,344,112 | 9/1994 | Peterson et al. | 248/313 |
| 5,505,417 | 4/1996 | Plocher | 248/311.2 |

*Primary Examiner*—Ramon O. Ramirez
*Assistant Examiner*—Gwendolyn Baxter
*Attorney, Agent, or Firm*—Leonard Tachner

[57] ABSTRACT

A water bottle cage for bicycles with pivoting bands that automatically capture and lock a water bottle upon insertion into the cage. The cage allows easy installation and removal of the water bottle using one hand. The cage has three components molded from a resilient, substantially rigid polymeric material including an elongated base portion with a half round band with a mating hinge at each end portion, a quarter round band with an extended curved leg at one end, a mating hinge generally in the middle and locking grooves at the other end, and a quarter round band with an extended curved leg at one end, a mating hinge generally in the middle and a locking member at the other end. The cage also includes two hinge pins and two torsion springs. The configuration allows the user to choose between a left or right side for the water bottle to be installed and removed. When installed, the water bottle cylindrical body is secured in place by a substantially round and locked band and the water bottle shoulder and base are secured between protruding surfaces on the cage. The cage is capable of readily receiving water bottles having side walls of slightly different diameters. Springs automatically open the band when a latch is released by the user. In a preferred embodiment, the structure of the cage creates an over-center spring action without physical springs. In this manner, the bands of the cage are spring-loaded in both the open and closed positions.

4 Claims, 10 Drawing Sheets

LOCKING WATER BOTTLE CAGE FOR BICYCLES

CROSS REFERENCE TO RELATED APPLICATIONS

This application is a continuation-in-part of patent application Ser. No. 09/079,078 filed on May 14, 1998.

BACKGROUND OF THE INVENTION

1. Field of the Invention

The present invention relates generally to the field of sporting goods and more specifically, to a selectively lockable water bottle retainer such as for use on the frame of a bicycle.

2. Prior Art

Water bottle cages are widely used by recreational bicyclists to carry water bottles with them when they ride. The most common type of cage in current use is made from aluminum or steel bar stock by bending it into two generally U-shaped sections, between which the water bottle is nested. One of the U-shaped sections is welded to a bracket having holes for fasteners by which the cage is attached to the down tube or seat tube of the bicycle frame. The design of the cage is such that it forms a spring so that when the water bottle is pushed into the cage, the cage flexes enough to allow the bottle to fit into position. This same spring action is intended to prevent the water bottle from inadvertently being dislodged from the cage. Another common type of cage in current use is molded from a resilient substantially rigid polymeric material. While the structure sometimes has a different appearance from the typical metal cage, the function is the same in that the structure forms a spring or has a separate spring including elastic bands for insertion and retention of the water bottle. The water bottles used with the cages have a circular cylindrical wall, a bottom wall, a neck having a cap and a shoulder between the side wall and the neck. Water bottles of this type are marketed by several manufacturers, and while those from various suppliers are very similar, there are differences among them in the diameter of the side wall. Accordingly, not all water bottles fit into any given cage the same such that some bottles are difficult to install and remove while others fit loosely and dislodge more easily. Moreover, it is not uncommon for bicyclists riding in organized tours or some types of races to replace empty water bottles with full ones at points along the route, the full bottles being furnished at random from a supply. If the water bottle is too small, it is prone to bouncing out of the cage. If it is too large, it will be hard to remove it from the cage for use and return it to the cage, or it may even not be possible to put it into the cage at all. As bicycling off-road, commonly called mountain biking, has gained in popularity, water bottle retention in the cage has become a bigger and bigger problem. This is evidenced by the common site of full and partially full water bottles strewn along trials which inadvertently bounced out of water bottle cages. Often the rider is unaware that their bottle fell out of their cage until they later reach down for a drink. This situation is frustrating and can be dangerous if the day is hot and the distance to a water source is far. It is also a waste of money and a source or litter. To combat this problem, water bottle cage makers increase the stiffness of the cage by using heavier gauge wire or thicker or more rigid plastic. The problem is that the stiffer the cage is, the more difficult it is to insert and remove the water bottle. With current water bottle cage design there is always a balance between being flexible enough to allow insertion and removal of the bottle and being stiff enough to allow good retention. Water bottles can bounce out of even very stiff water bottle cages when riding over very rough terrain. In certain other sports such as personal water craft (Jet Ski's and the like), users face similar problems for adequately retaining their bottles. Some riders use auxiliary straps with Velcro or buckles to secure the water bottle to the cage. The problem is that the cyclist must then stop and use both hands in order to obtain a drink whereas many cyclists prefer to drink while simultaneously riding.

Sometimes riders use rechargeable battery powered lights for riding at night. Often the batteries for these units are packaged in a water bottle so that they can be carried in the water bottle cage. These batteries are heavier than a water filled bottle and have an even greater tendency to bounce out of the cage which can be dangerous and cause damage to the relatively expensive battery pack.

Water bottle cages generally require the rider to insert the bottle from above the cage. Typically, water bottle cages are mounted to the down tube and sometimes also to the seat tube if the frame is large enough. Frames that are small have very little space between the bottom of the top tube and the top of the water bottle cage. Also, some full suspension mountain bikes have the same space limitation in order to make room for the suspension geometry. These frames make insertion and removal of water bottles difficult if using ordinary water bottle cages because the water bottle interferes with the top tube during insertion and removal.

SUMMARY OF THE INVENTION

An object of the present invention is to provide a water bottle cage that automatically locks the water bottle into the cage upon insertion of the water bottle. Another object is to provide a water bottle cage that has a configuration that causes the water bottle to be squeezed tighter upon a secondary action of the user. Another object is to provide a water bottle cage that has a configuration that facilitates easy and fast insertion and removal of the water bottle cage that is capable of readily receiving water bottles having side walls of slightly different diameters. Another object is to provide a water bottle cage that is simple and inexpensive to produce, durable and attractive in appearance. Another object is to provide a configuration that can easily be changed by the user to allow insertion and removal of the bottle from the right side or the left side per the user's preference or to alleviate interference between the bike frame and the water bottle during insertion and removal.

The foregoing and other objects are attained, according to the present invention, by a water bottle cage for bicycles for use with a water bottle of the type having a circular cylindrical side wall, a bottom wall, a neck receiving a cap and a shoulder between the side wall and neck. In the preferred embodiment, the cage has three components molded from a resilient, substantially rigid polymeric material including an elongated base portion with a half round band with a mating hinge at each end portion, a quarter round band with an extended curved leg at one end, a mating hinge generally in the middle and locking grooves at the other end, and a quarter round band with an extended curved leg at one end, and a mating hinge generally in the middle and a locking member at the other end. The cage also includes two hinge pins and two springs. In one embodiment, the elongated base portion with the half round band with a mating hinge at each end portion is symmetric so that when fitted to the bicycle frame in one direction, the bottle is inserted and removed from the right side and when fitted upside down, the bottle is inserted and removed from the left side.

When assembled, the cage's two quarter round bands hinge on the half round band's ends. When the quarter round bands are pivoted to their closed position, the locking member automatically engages the locking grooves and a generally circular band is formed from the half round and quarter round bands. When the locking member is disengaged from the locking grooves, the springs cause the quarter round bands to pivot open to a position such that the locking member end and locking groove end are wide enough to easily allow a water bottle to pass between them. When the water bottle passes through this opening, the bottle begins contact with the extended curved legs on the other end of the quarter round bands which causes the quarter round bands to pivot towards their closed position. When the bottle is pushed far enough into the cage so that it contacts the half round band, the quarter round bands have closed and the lock member has engaged the locking grooves of the quarter round bands. Because the circular band, formed by the half round and two quarter round bands, is substantially rigid, the water bottle is now securely locked into the cage and cannot dislodge. The upper and lower ends of the elongated base prevent the water bottle from sliding up or down. If the rider prefers an even tighter fit, he or she can squeeze together the quarter round bands and the locking member will engage into a more distant locking groove. To remove the water bottle from the cage, the rider pulls the locking member with a finger or thumb while grasping the water bottle and it easily lifts out of the mechanism.

In the preferred embodiment, the structure of the cage creates an over-center spring action without physical springs. In this manner, the two bands of the cage are spring-loaded in both the open and closed positions.

BRIEF DESCRIPTION OF THE DRAWINGS

The aforementioned objects and advantages of the present invention, as well as additional objects and advantages thereof will be more fully understood hereinafter, as a result of a detailed description of preferred embodiments thereof, when taken in conjunction with the following drawings in which.

DETAILED DESCRIPTION OF PREFERRED EMBODIMENTS

Figure 1:
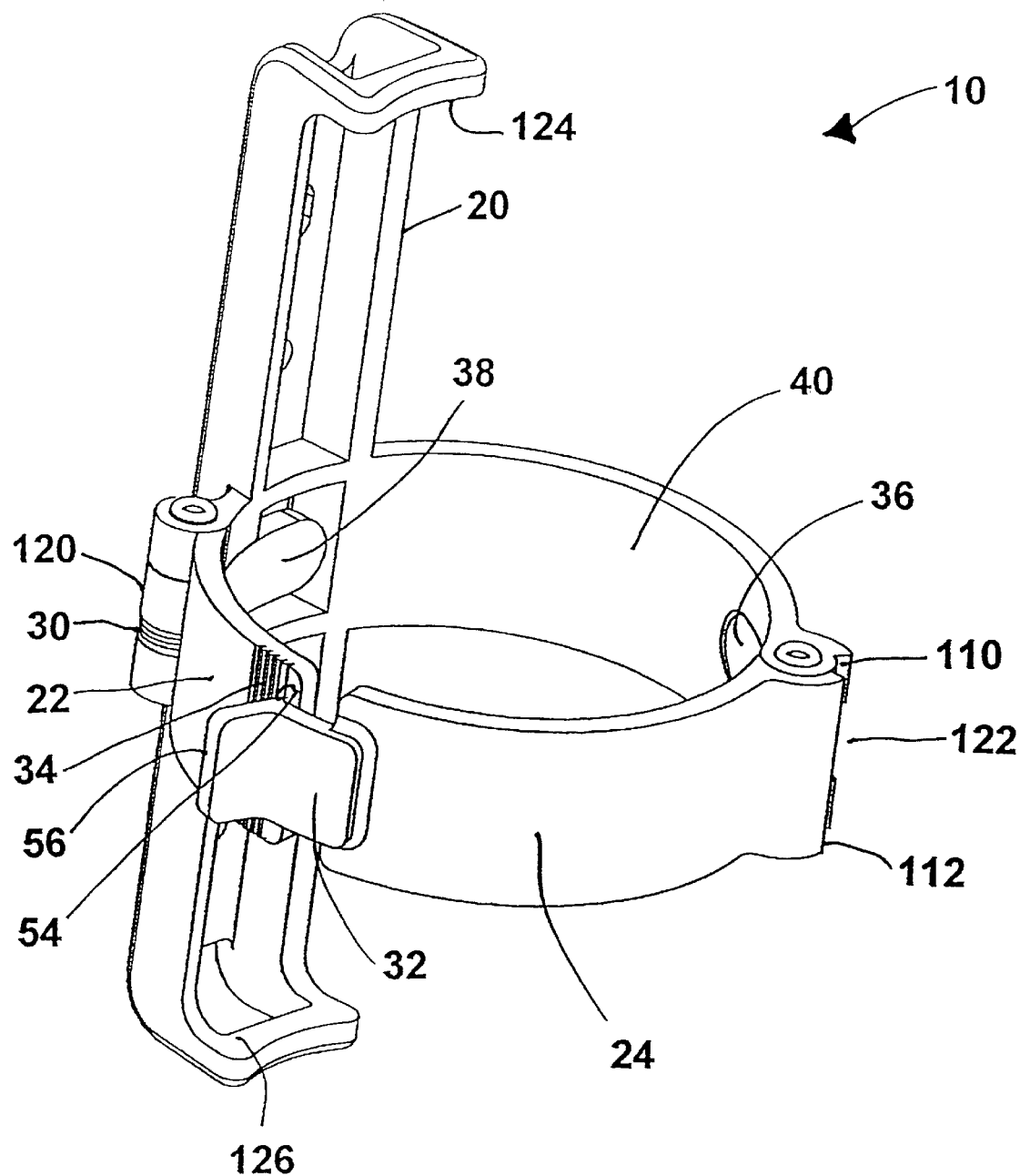
FIG. 1 is a three-dimensional view of a preferred embodiment from the left side and slightly above with the band closed and locked.

A first embodiment of the present invention may be understood by referring to FIGS. 1–7. It will be seen that a locking bicycle water bottle cage 10 comprises three components molded from a resilient, substantially rigid polymeric material and has an elongated base 20, a band 22 and a band 24. The cage also includes two hinge pins 28 and two torsion springs 30. In the preferred embodiment, the elongated base 20 has a half round band 40 with a mating hinge 42 at one end and a mating hinge 44 at the other end. There are spring recesses 46 and 48 in mating hinges 42 and 44, respectively. Band 22 is connected to the elongated base 20 by the spring 30 and a hinge pin 28. Band 24 is connected to the elongated base 20 by another spring 30 and another hinge pin 28. The cage 10 is mounted to the bicycle by two standard threaded fasteners 108 through either slot 100 and hole 104 or, alternatively, hole 102 and slot 106 depending on the user's preference. Slots 100 and 106 are slots instead of holes because they compensate for manufacturing tolerances of bicycle frames and of the bicycle bottle cage.

The springs 30 provide force to open bands 22 and 24 when a latch 32 is disengaged from locking grooves 34.

With the exception of spring recesses 46 and 48, the elongated base 20 is symmetric about center line 68. If the cage 10 is mounted to the bicycle frame with one end up, then it is configured for right side entry and if it's mounted to the bicycle frame with the other end up, then it is configured for left side entry.

In FIG. 1, the water bottle cage 10 is assembled and is in its closed and locked position without a water bottle in place. Latch 32 of band 24 is locked to band 22 by surface 54 engaging in the locking grooves 34. To release the lock, the user pulls on surface 56 of latch 32 which will disengage surface 54 from locking grooves 34 because of flex in the band 24 and band 40. A torsion spring 30 (see FIG. 2 and 6) will force the band 24 to rotate about the hinge 122 until stop surface 112 of band 24 contacts stop surface 110 of band 40. Leg 36 of band 24 will then be protruding towards the center of the radius of band 40. Another torsion spring 30 will simultaneously force band 22 to rotate about hinge 120 until stop surface 114 (see FIG. 6) of band 22 contacts stop surface 116 (see FIG. 6) of elongated base 20. Leg 38 of band 22 will then be protruding towards the center of the radius of band 40. Surfaces 124 and 126 capture the shoulder and base of the water bottle so that it cannot slide up or down when installed into cage 10.

Figure 2:
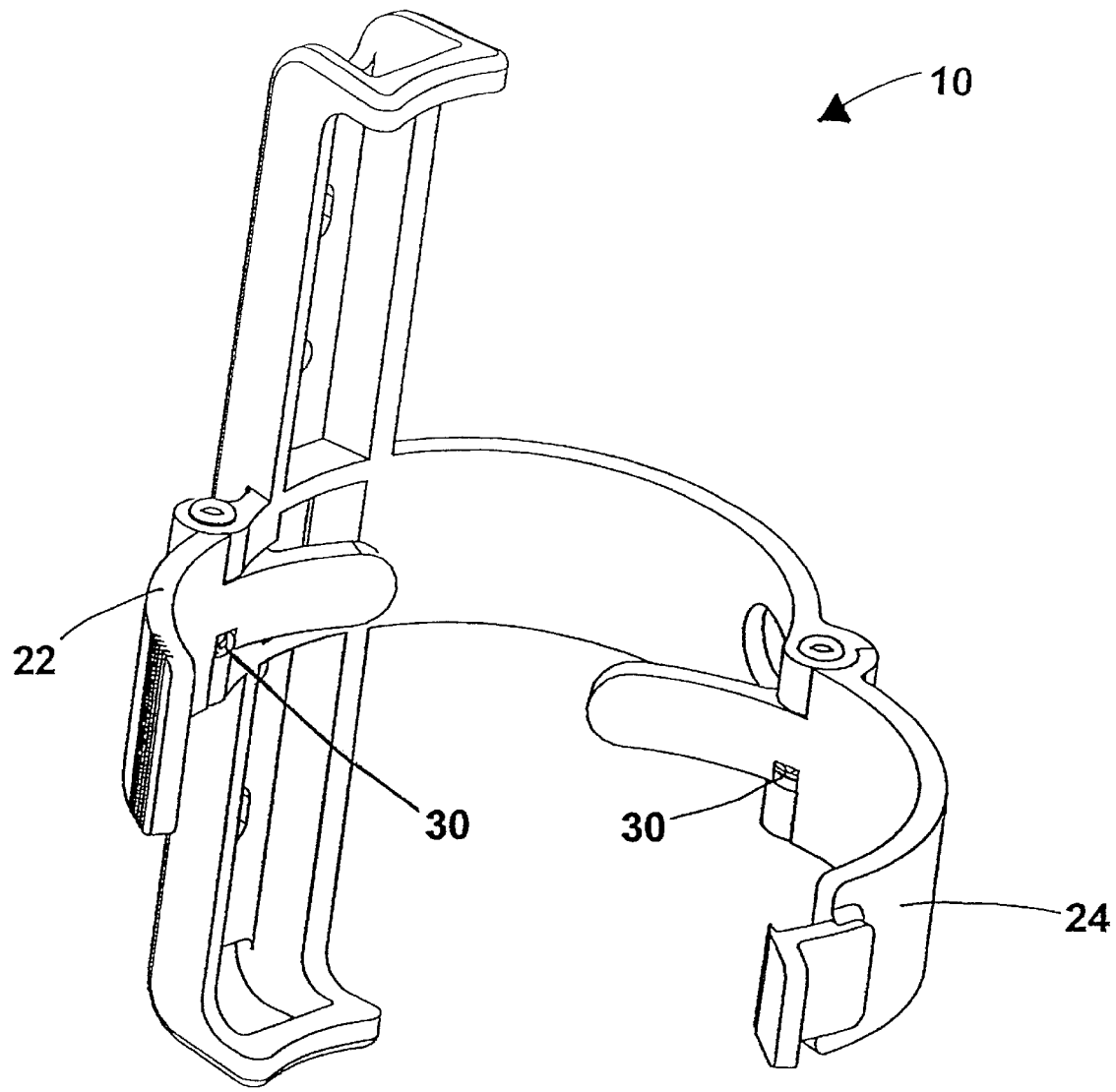
FIG. 2 is a three-dimensional view from the left side and slightly above with the band fully open.

In FIG. 2, the water bottle cage 10 is assembled and is in fully open position without a water bottle in place. The two torsion springs 30 hold open bands 22 and 24. Band 22 opens less than band 24 in order to not interfere with the bicyclist's leg or the bicycles' crank arm.

Figure 3:
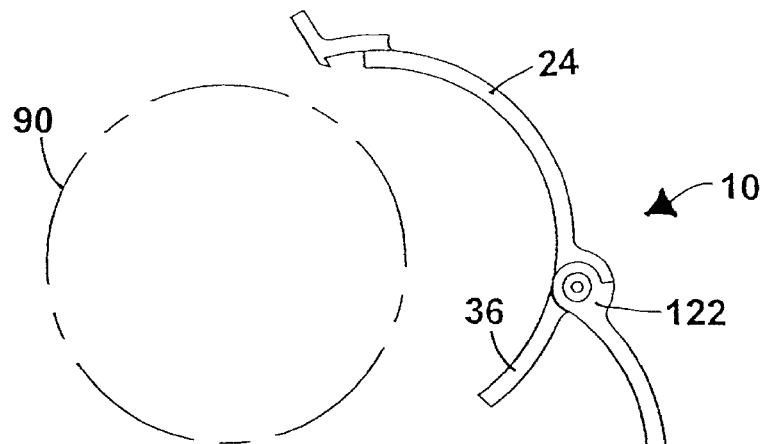
FIG. 3 is a top view with the band fully opened and a water bottle shown in phantom.

In FIG. 3, the water bottle cage 10 is shown from the end with the bands 22 and 24 in their most open position. As a water bottle 90 is placed into the cage, the cylindrical water bottle body will contact legs 38 and 36 which will rotate bands 22 and 24 about hinges 120 and 122, respectively.

Figure 4:
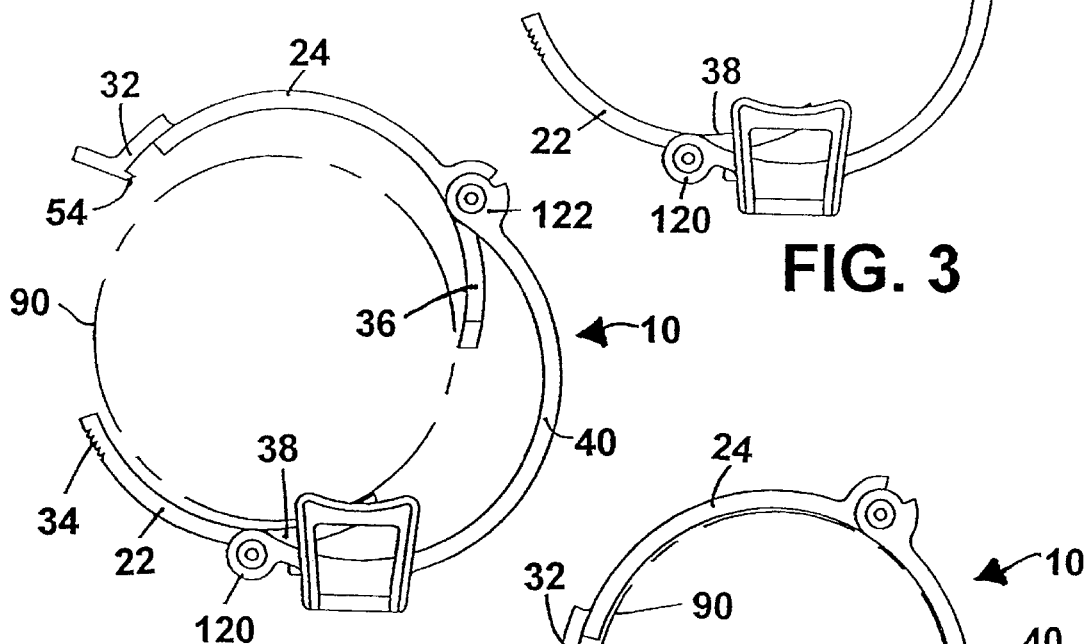
FIG. 4 is a top view with the band partially opened and a water bottle shown in phantom being installed.

In FIG. 4, the water bottle 90 is partially installed into the water bottle cage 10. The cylindrical water bottle body is pushing on legs 38 and 36 which has rotated bands 22 and 24 about hinges 120 and 122. When the water bottle is nearly completely inserted into the water bottle cage 10, latch surface 54 will begin to contact locking grooves 34. Bands 24 and 40 will flex outward enough to allow latch surface 54 of latch 32 to ratchet along locking grooves 34.

Figure 5:
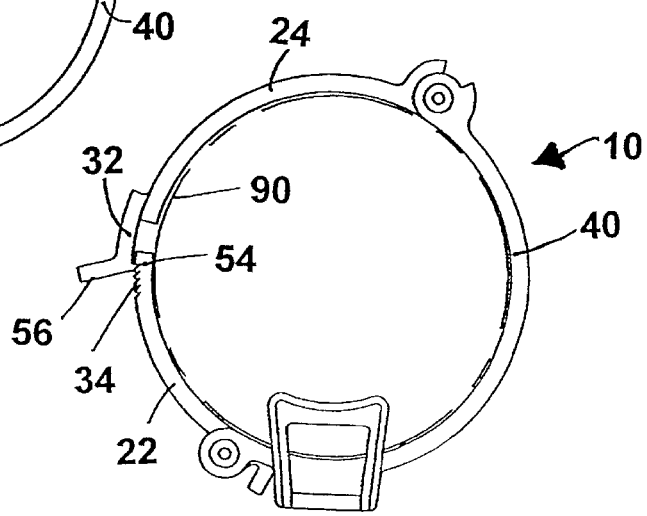
FIG. 5 is a top view with the band closed and locked and a water bottle shown in phantom installed.

In FIG. 5, the water bottle 90 is completely installed into water bottle cage 10 and bands 22, 24 and 40 form a generally circular band around the water bottle cylindrical body and latch 32 is securely engaged in locking grooves 34. If the water bottle body cylindrical diameter is slightly bigger than average, then latch surface 54 will engage in one of the first of the locking grooves 34 it contacts. If the water bottle body cylindrical diameter is slightly smaller than average, latch surface 54 will engage in one of the later locking grooves 34 that it contacts. In this way, small variations in water bottle body cylindrical diameters are accommodated by cage 10. To remove the water bottle 90 from the water bottle cage 10, the user pulls on surface 56, which disengages latch 32 from locking grooves 34. The user simultaneously tugs on the water bottle 90. The water bottle will easily pull away from the water bottle cage 10 both because pulling the water bottle forces bands 22 and 24 to spread open once the latch 32 is released and because spring action also spreads open bands 22 and 24.

Figure 6:
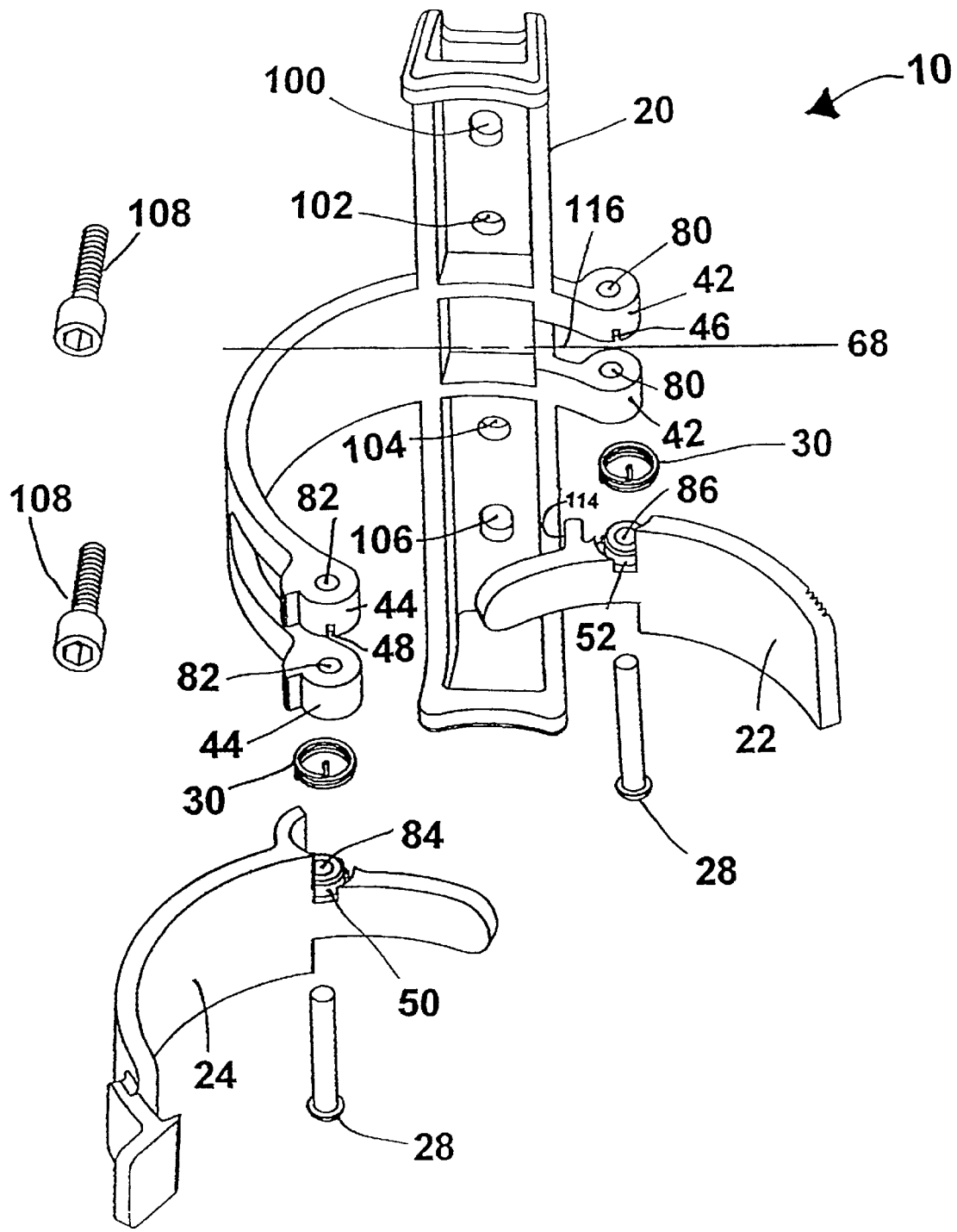
FIG. 6 is an exploded view of the invention.

In FIG. 6, the water bottle cage 10 is shown in an exploded view. Note that the hinge pins 28 could be pins press fit into position or they may be rivets. For assembly, a torsion spring 30 is placed on the spring recess 52 of band 22. The band 22 is placed within mating hinge 42 of elongated base 20 such that the torsion spring 30 fits into the spring recess 46. Then a hinge pin 28 is pushed through holes 80 and 86 to form a spring loaded hinge. A second torsion spring 30 is placed on the spring recess 50 of band 24. Then band 24 is placed within mating hinge 44 of elongated base 20 such that the torsion spring 30 fits into spring recess 48. Then a hinge pin 28 is pushed through holes 82 and 84 to form a second spring loaded hinge. Cage 10 is mounted to the bicycle by two standard threaded fasteners 108 through either slot 100 and hole 104 or, alternatively, hole 102 and slot 106 depending on the user's preference. Bicycles generally have threaded female bosses on various locations of the frame to accommodate one or more water bottle cages. Slots 100 and 106 are slots instead of holes because they compensate for manufacturing tolerances of bicycle frames and of the bicycle bottle cage. With the exception of hinge recesses 46 and 48, the elongated base 20 is symmetric about center line 68. If the cage 10 is mounted to the bicycle frame with one end up, then it is configured for right side entry and if it is mounted to the bicycle frame with the other end up, then it is configured for left side entry. Stop surface 114 of band 22 contacts stop surface 1 16 of elongated base 20 when the torsion spring 30 pushes band 22 to its most extreme open position.

Figure 7:
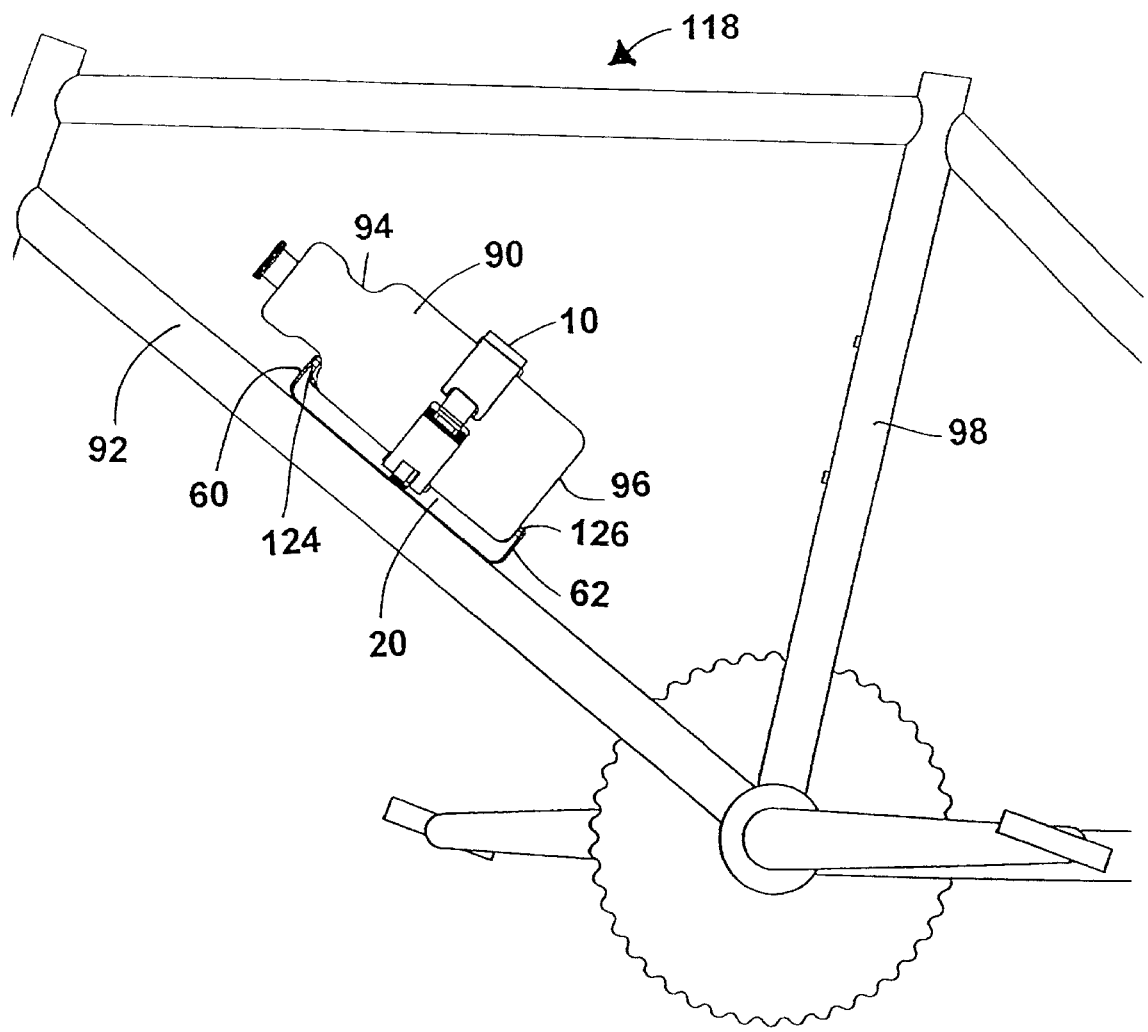
FIG. 7 is a side elevational view of the cage as mounted on a bicycle frame and with a water bottle installed in it.

In FIG. 7, the cage 10 is mounted on a bicycle frame 118 down tube 92 with a water bottle 90 installed in it. The cage 10 is mounted in a left side entry configuration because end 60 is upwards on the down tube 92. If cage 10 had been mounted with end 62 upwards, then the cage 10 would have been in a right entry configuration. Surface 124 of the elongated base 20 prevents the upper shoulder 94 of bottle 90 from sliding up. Surface 126 of elongated base 20 prevents the bottle base 96 of bottle 90 from sliding down. If desired, a second water bottle cage could also be mounted to the seat tube 98 on this particular bicycle frame.

With the benefit of the foregoing description of the first embodiment, those skilled in the art will easily perceive other embodiments. For example, the band 40 could be an independent part from elongated base 20 so that it could be mounted at various angles to the elongated base by the user to have entry occur on either side or anywhere in between. Another example is that band 40 could be an independent part from elongated base 20 and riveted to elongated base 20 so that it rotates to provide a left side or right side entry configuration without turning the whole cage upside down. Another example is a cage with only one moving band instead of two. Another example is a configuration with elongated base 20 having band 40 designed so that it is front entry instead of side entry. Another example is that there could be various other latching means other than the one described. A secondary latch could also be added to the automatic latch. Another example is that slot 100 and hole 102 could have been one long slot, and hole 104 and slot 106 could have been one long slot to provide finer mounting location adjustment for the user. Various other means to spring load the bands could be employed. The cage, in fact, works even without the springs although not quite as well. The cage could also be made from materials other than resilient substantially rigid polymeric such as formed metal sheeting or wire. Another example is a cage that is made so that the structure forms an over center spring so that the cage is relaxed when it is either open or closed but is spring loaded in position in between. Another example is a cage with one or more of the articulated bands that does not have a latch but is held into position by spring pressure alone.

Figure 8:
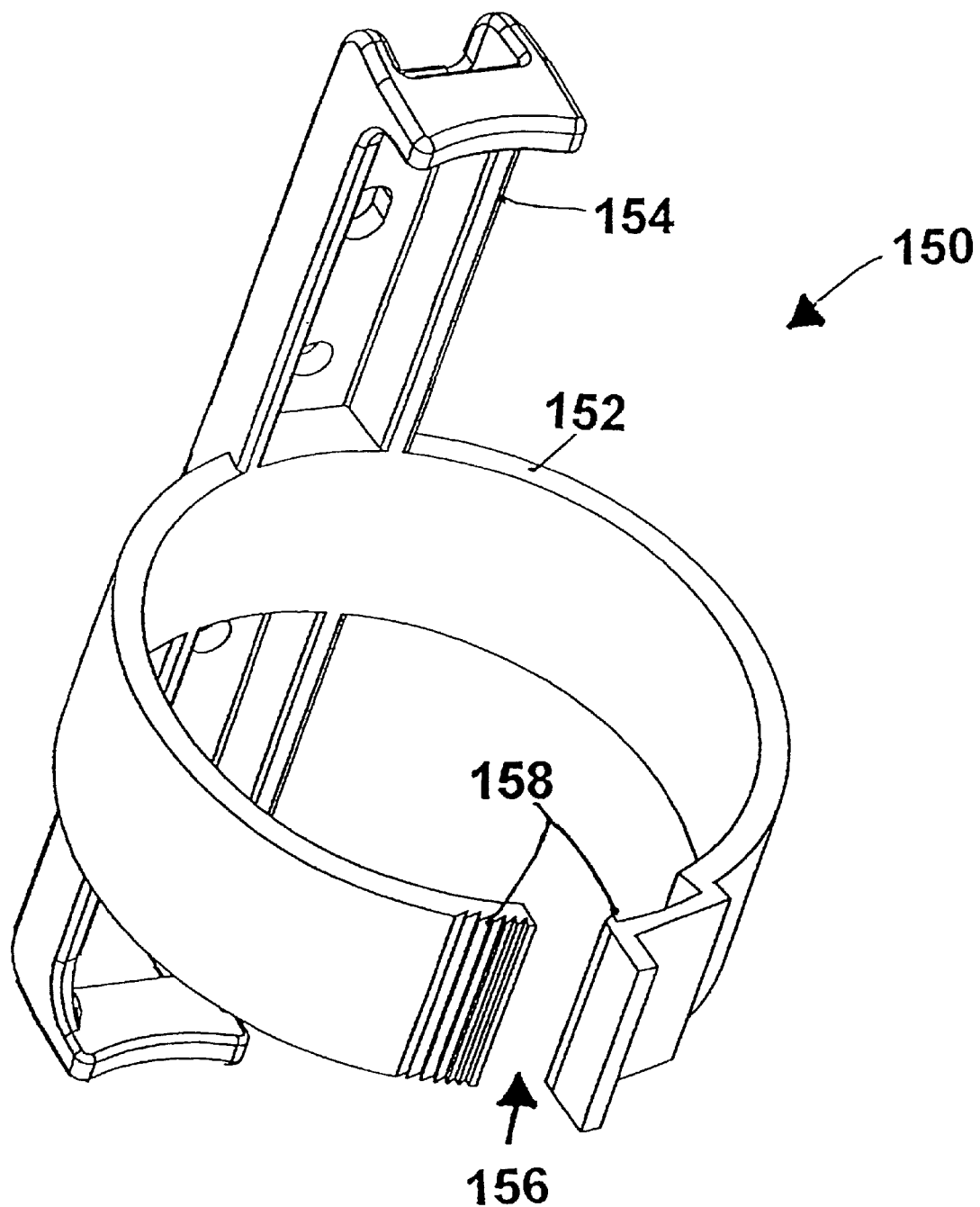
FIG. 8 is a three-dimensional view of an alternative embodiment of the invention.

Still another example of an alternative embodiment is shown in FIG. 8. In this version 150 of the invention, the use of separate subcircular members hinged together at one or more locations is obviated by a single circumferential rib 152 attached to the base 154 along its length. The rib 152 is sufficiently flexible to provide a gap 156 which may be opened and closed to selectively insert and retain a water bottle which is inserted in a direction parallel to the base elongation. The gap 156 can be held closed by a lock 158 which is the same as that used in the first embodiment of FIGS. 1–7.

Still another example of an alternative embodiment is shown in FIGS. 9–14. In this embodiment, the structure creates an over-center spring action so that embodiment 160 is spring loaded both open and closed. The structure could be made from a substantially rigid polymeric material or any other material that is relatively rigid, but has good flexural memory. This embodiment 160 of the invention is described below.

Figure 9:
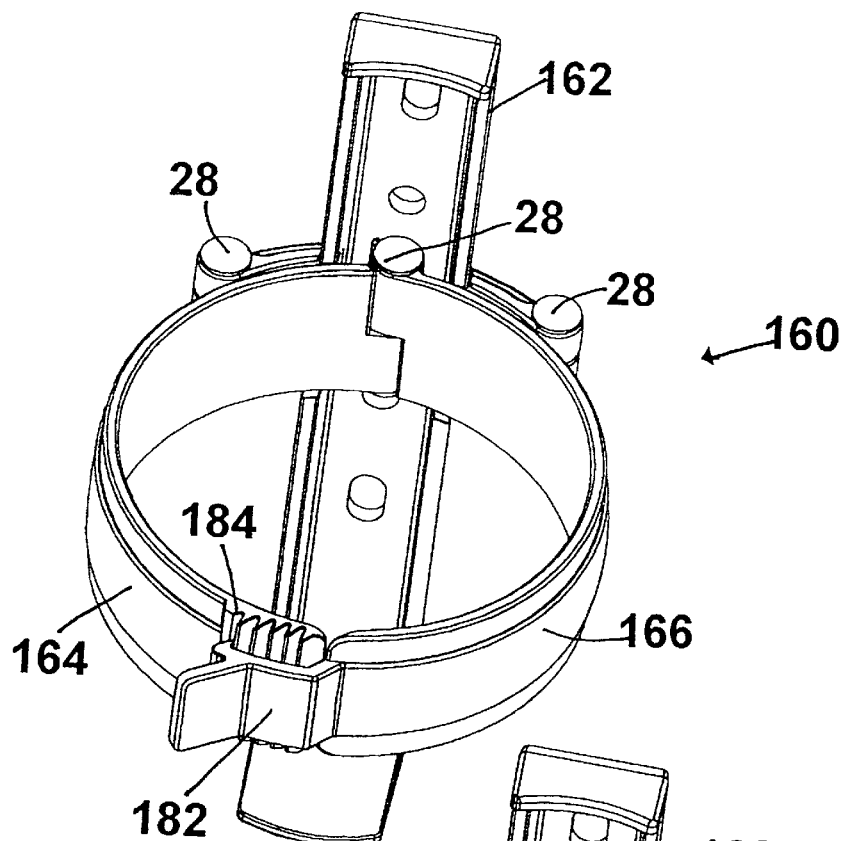
FIG. 9 is a three-dimensional view of an alternative embodiment of the invention from slightly above with the bands closed and locked.

In FIG. 9, the water bottle cage 160 is shown assembled in its closed and locked position without a water bottle in place. A base 162 is connected to half round bands 164 and 166 by three rivets 28. Latch 182 of band 166 is locked to locking grooves 184 of band 164 as in the first embodiment of FIGS. 1–7. Bands 164 and 166 are additionally held closed by an over-center spring formed by the structure and its pivot point locations.

Figure 10:
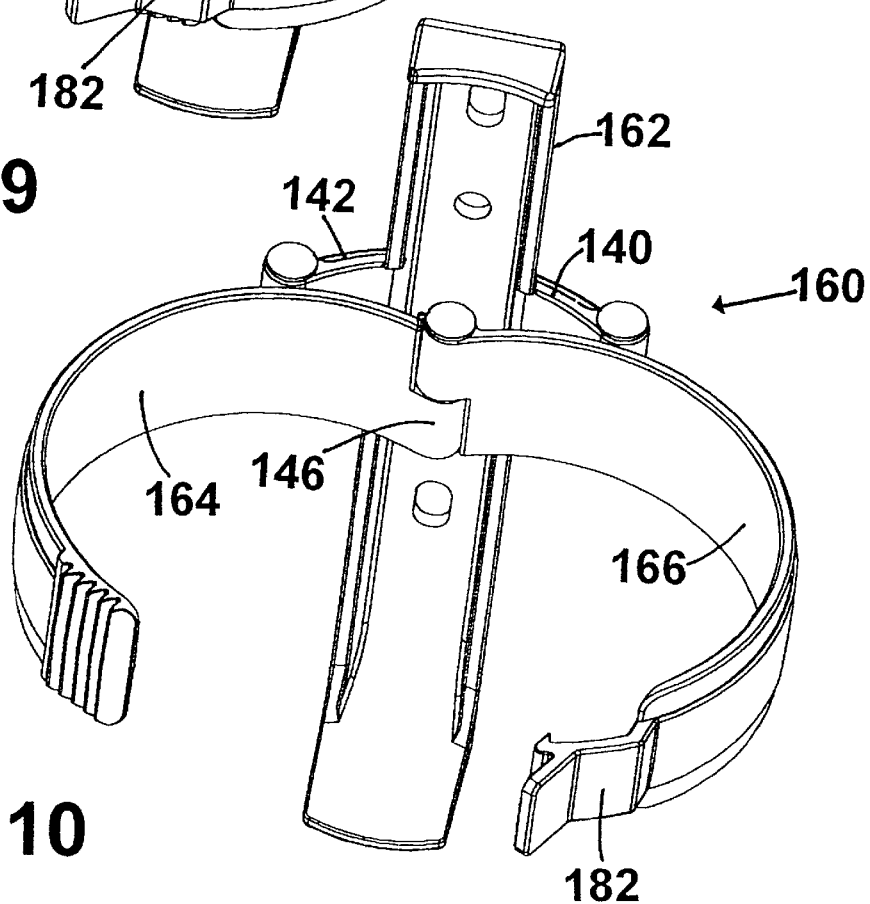
FIG. 10 is a three-dimensional view from slightly above with the bands fully open.

In FIG. 10, the water bottle cage 160 is shown assembled and in its fully open position without a water bottle in place. Bands 164 and 166 are held open by an over-center spring formed by the structure and its pivot point locations. To permit bands 164 and 166 to rotate into the opened position from the closed position as shown in FIG. 9, arms 140 and 142 of base 162 flex outwardly during the transition. The user creates the force that causes this outward flex by pulling on latch 182. After bands 164 and 166 have slightly passed the half open position, arms 140 and 142 begin to return to their relaxed geometry as they cause bands 164 and 166 to open fully. When the user pushes a water bottle into embodiment 160, it will contact the surfaces of hinge 146 which cause bands 164 and 166 to begin to rotate closed and cause arms 140 and 142 to flex outwardly. After the bands 164 and 166 are slightly past the half closed position, arms 140 and 142 begin to return to their relaxed geometry as they cause bands 164 and 166 to close and lock. The force of the water bottle being pressed into the surface of hinge 146 also causes bands 164 and 166 to close and lock.

Figure 11:
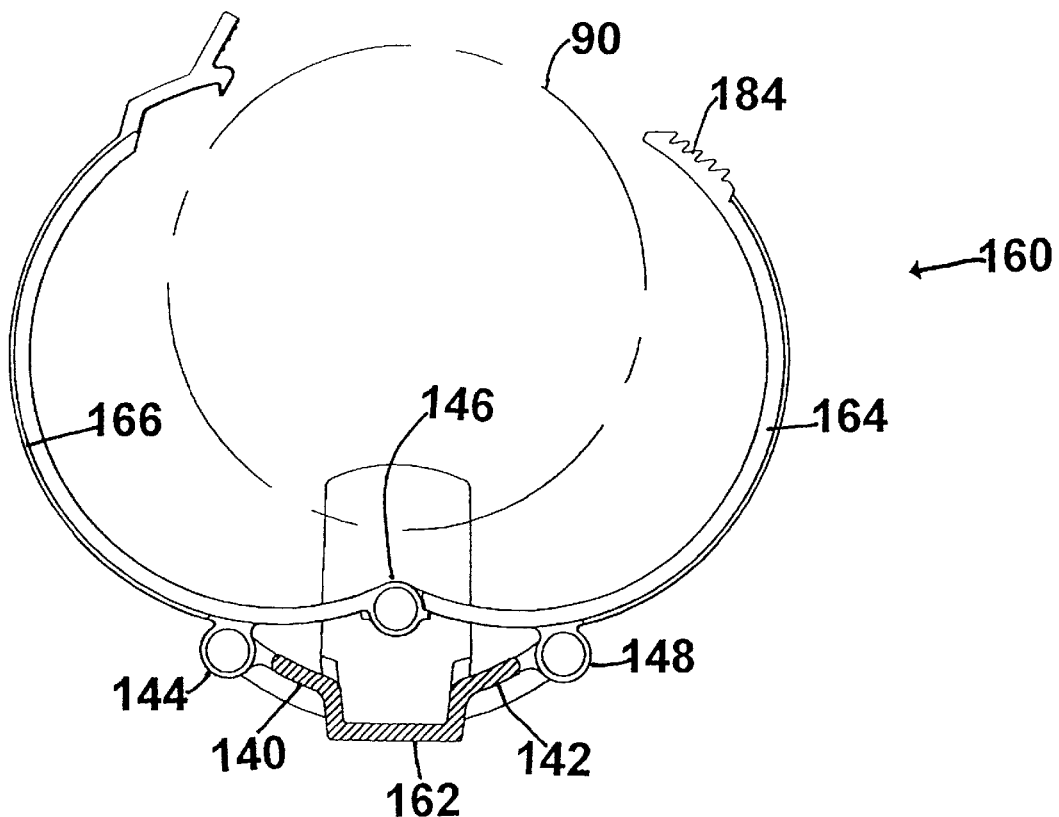
FIG. 11 is a top view with the band fully opened with the base sectioned and a water bottle shown in phantom.

In FIG. 11 the water bottle cage 160 is shown from the end with base 162 sectioned and bands 164 and 166 in their most open position. Arms 140 and 142 act as a spring that holds bands 164 and 166 open. As a water bottle 90 is placed into the cage, the cylindrical water bottle body contacts the surfaces of hinge 146 which begins to rotate bands 164 and 166 about hinges 144, 146 and 148. To permit bands 164 and 166 to rotate towards closure, hinge 146 must pass between hinges 144 and 148 which causes arms 140 and 142 of base 162 to flex outwardly.

Figure 12:
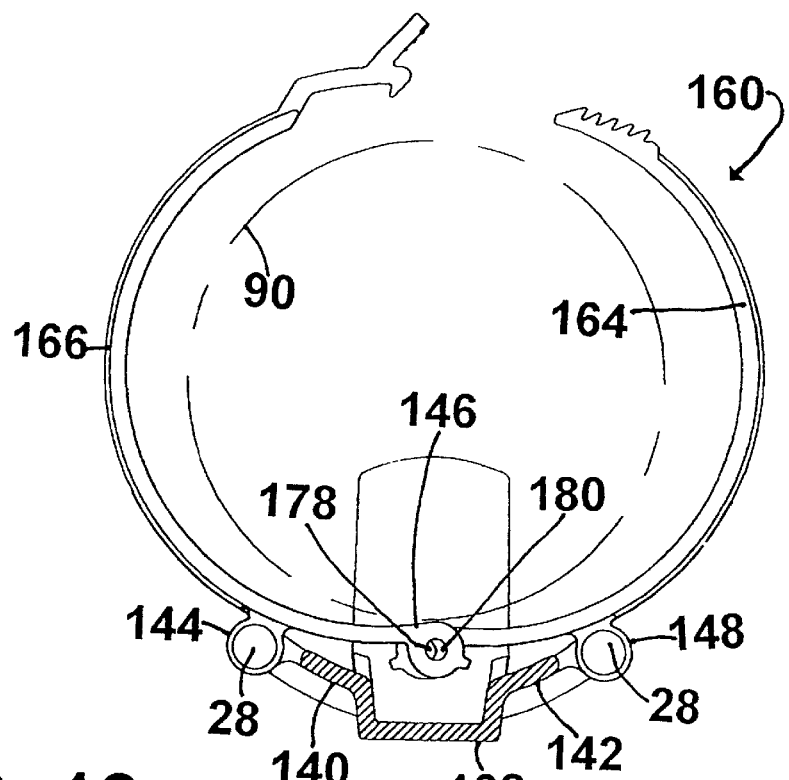
FIG. 12 is a top view with band half way opened with the base sectioned and a water bottle shown in phantom being installed.

In FIG. 12 the water bottle 90 is shown about half way installed into the water bottle cage 160, illustrating the over-center spring structure. Base 162 is sectioned. For illustration purposes, hinge 146 is shown without hinge pin 28 that would center holes 178 and 180. The cylindrical water bottle body is pushing on the surfaces of hinge 146 which has rotated bands 164 and 166 about hinges 144, 146 and 148.

In FIG. 12, hinge pin 28 that would have centered holes 178 and 180 is omitted, and there is therefore an overlap between holes 178 and 180. It is understood that if hinge pin 28 had been assembled to hinge 146, then arms 140 and 142 of base 162 would have had to flex outwardly which creates the over-center spring such that bands 164 and 166 are spring loaded in both the fully open and fully closed and locked configurations.

Figure 13:
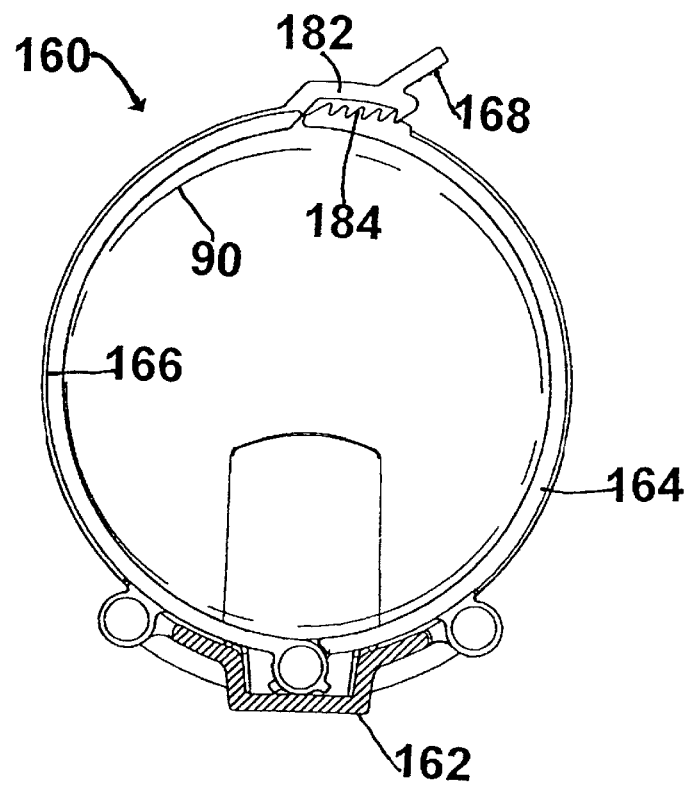
FIG. 13 is a top view with the band closed and locked with the base sectioned and a water bottle shown in phantom installed.

In FIG. 13 the water bottle 90 is completely installed into water bottle cage 160 and bands 164 and 166 generally from a circular band around the water bottle cylindrical body and latch 182 will be securely engaged in locking grooves 184 which is the same as the first embodiment of FIGS. 1–7. Base 162 is sectioned and water bottle 90 is shown slightly smaller in diameter than standard. To remove the water bottle 90 from the water bottle cage 160, the user pulls on surface 168, which disengages latch 182 from locking grooves 184. The user simultaneously tugs on the water bottle 90. The water bottle will pull away from the water bottle cage 160 because pulling the water bottle forces bands 164 and 166 to spread open once latch 182 is released. After bands 164 and 166 are pulled open slightly more than half way, they will open fully due to the over-center spring action of the structure.

Figure 14:
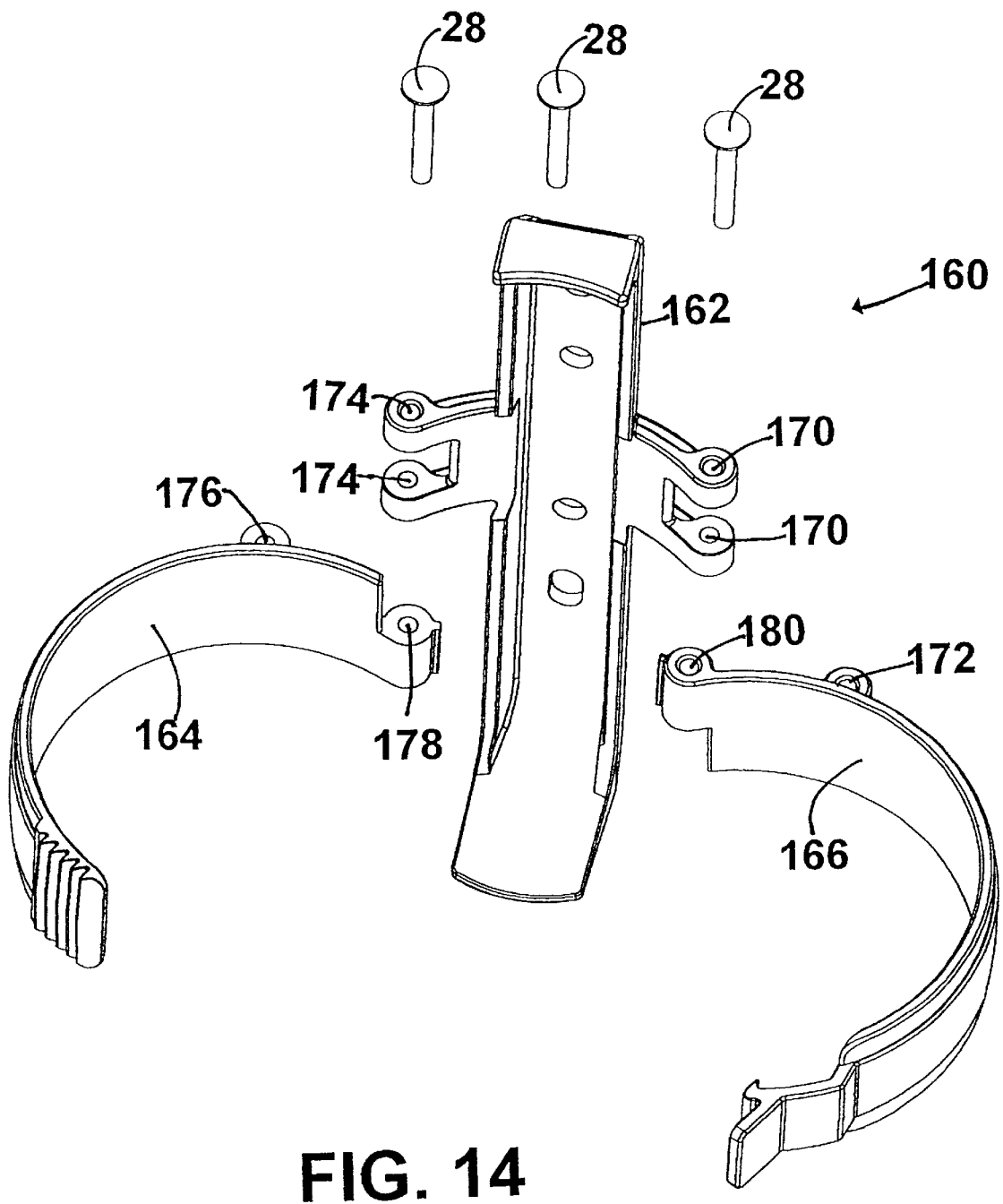
FIG. 14 is an exploded view of the alternative embodiment.

In FIG. 14 the water bottle cage 160 is shown in an exploded view. Note that the three hinge pins 28 could be pins press fit into position or rivets. For assembly, a hinge pin 28 is pushed through holes 180 and 178 of bands 166 and 164, respectively. Then another hinge pin 28 is pushed through holes 174 and 176 of base 162 and 164, respectively. Then another hinge pin 28 is pushed through holes 170 and 172 of base 162 and band 166, respectively. The cage 160 will be mounted to the bicycle frame in the same manner as the first embodiment shown in FIGS. 1–7.

Accordingly, it will be understood that the various embodiments described herein are merely exemplary and not limiting of the scope hereof. Moreover, it will also be understood that the variety of additions and modifications which may be made to the disclosed embodiments are all within the scope of the invention which is to be limited only by the appended claims and their equivalents.

It is claimed:

1. A water bottle retaining apparatus for attachment to a bicycle, the apparatus comprising:

an elongated spine base having an axis adapted to be positionable to be parallel to a water bottle and having first and second substantially semi-circular rigid ribs affixed to said base in a direction substantially perpendicular to said axis, each said semi-circular rigid rib having a mating hinge at adjacent ends of said ribs; and said first and second substantially semi-circular rigid ribs each having a mating hinge along the length of said first and second substantially semi-circular rigid ribs for mating with a respective mating hinge of said elongated spine base for articulation of each said semi-circular rigid rib relative to said spine in an over-center spring pivoting configuration for spring-loaded opening and closing of said apparatus.

2. The retaining apparatus recited in claim 1 wherein said first and second semi-circular rigid ribs have respective mating inter-locks for selectively locking one said semi-circular rib to another said semi-circular rib forming a rigidly locked circular retainer of a water bottle.

3. The apparatus recited in claim 2 wherein said inter-locks comprise means for compensating for variations in water bottle diameter.

4. A water bottle retainer comprising:

an elongated base for attachment to a support frame;

a plurality of circumferential ribs having an axis substantially parallel to said elongated base and being attached to said base to extend therefrom, said ribs having a gap along the length of said circumferential ribs which are selectively widened to permit the ribs to receive a water bottle;

a lock on said ribs adjacent said gap for locking said ribs around a water bottle upon selective closure of said gap; and means for attaching said ribs to said base for spring-loaded action in both opening and closing said retainer.

* * * * *